United States Patent
Madappa et al.

(10) Patent No.: US 11,281,634 B2
(45) Date of Patent: Mar. 22, 2022

(54) MANAGEMENT OF VOLUME FILES IN A DISTRIBUTED FILE SYSTEM

(71) Applicant: Red Hat, Inc., Raleigh, NC (US)

(72) Inventors: Kaushal Madappa, Pune (IN); Aravinda Vishwanathapura Krishna Murthy, Bengaluru (IN)

(73) Assignee: RED HAT, INC., Raleigh, NC (US)

( * ) Notice: Subject to any disclaimer, the term of this patent is extended or adjusted under 35 U.S.C. 154(b) by 105 days.

(21) Appl. No.: 16/246,316

(22) Filed: Jan. 11, 2019

(65) Prior Publication Data
US 2020/0226104 A1  Jul. 16, 2020

(51) Int. Cl.
*G06F 16/182* (2019.01)
*G06F 3/06* (2006.01)

(52) U.S. Cl.
CPC .......... *G06F 16/1844* (2019.01); *G06F 3/065* (2013.01); *G06F 3/067* (2013.01); *G06F 3/0614* (2013.01)

(58) Field of Classification Search
CPC .... G06F 16/1844; G06F 3/0614; G06F 3/065; G06F 3/067
See application file for complete search history.

(56) References Cited

U.S. PATENT DOCUMENTS

| | | | | |
|---|---|---|---|---|
| 6,643,754 | B1* | 11/2003 | Challenger | G06F 12/023 707/999.202 |
| 9,052,831 | B1* | 6/2015 | Stefani | G06F 16/278 |
| 9,146,930 | B2 | 9/2015 | Tang | |
| 10,037,340 | B2 | 7/2018 | Darcy | |
| 2013/0297873 | A1* | 11/2013 | Hyde, II | G06F 3/0608 711/117 |
| 2019/0332267 | A1* | 10/2019 | Muniswamy-Reddy | H04L 67/1031 |

OTHER PUBLICATIONS

CN105262820 A, Jan. 20, 2016, Inspur Electronic Information Industry Co Ltd.
CN107734026 A, Feb. 23, 2018, Zhengzhou Yunhai Information Tech Co Ltd.
Marcel Hergaarden, Red Hat Gluster Storage Technical Presentation, Apr. 2017, 60 pages, Sr. Solution Architect Benelux) (https://www.redhat.com/cms/managed-files/Red%20Hat%20Gluster%20Storage%20Technical%20Deck%281%29.pdf).
Pengcheng Zhou, ECStor: A Flexible Enterprise-Oriented Cloud Storage System Based on GlusterFS, 2016 International Conference on Advanced Cloud and Big Data, 6 pages, 2016 IEEE, School of Computer science & Engineering, Southeast University, Nanjing, PR China (https://ieeexplore.ieee.org/document/7815179/).

(Continued)

*Primary Examiner* — Jensen Hu
(74) *Attorney, Agent, or Firm* — Haynes and Boone, LLP (57) ABSTRACT

A method includes creating at least one distributed replicated volume having a plurality of sub-volumes, wherein each sub-volume of the plurality of sub-volumes includes at least one brick, creating at least one volfile content file associated with the volume, wherein the at least one volfile content file includes a description of at least one of the plurality of sub-volumes and a description of at least one brick corresponding to the at least one sub-volume, and using the volfile content file to perform an operation on at least one of the plurality of sub-volumes without performing the operation on the other sub-volumes.

20 Claims, 5 Drawing Sheets

(56) References Cited

OTHER PUBLICATIONS

Qiuming Lou, WebGlustersFS: A Web-Based Administration Tool for GlusterFS with Resource Assignment for Various Storage Demands, Computers in Industry 100 (2018) 21-30, College of Computer Science and Software Engineering, Shenzhen University, China (https://www.sciencedirect.com/science/article/pii/S0166361517303202).

Manikandan Selvaganesan, An Insight about GlusterFS and its Enforcement Techniques, 2016 International Conference on Cloud Computing Research and Innovations, 2016 IEEE, Department of Products & Technologies, Red Hat, Bangalore, India (https://ieeexplore.ieee.org/document/7600187/).

* cited by examiner

MANAGEMENT OF VOLUME FILES IN A DISTRIBUTED FILE SYSTEM

BACKGROUND

The present disclosure relates generally to distributed file systems, and more particularly, making operations on particular sub-volumes in a distributed file system more efficient.

Distributed file systems are those in which files are stored across multiple, distinct servers. Each of the servers includes various types of storage devices which can store files. The files on the distributed computing system can be accessed transparently from a client device. In other words, from the perspective of the client device, it is interacting with a single storage volume.

One type of distributed file system is a Gluster file system. Gluster file systems are distributed file systems that can scale out in a building-block fashion to store data. Additionally, Gluster file systems can aggregate disk storage resources from multiple servers into a single global namespace. Gluster file systems utilize various storage volumes. In Gluster, a volume is a logical collection of bricks. A brick is an export directory that is stored on one of the servers in the pool of servers that are used by the Gluster file system.

One type of volume is a distributed replicated volume. Distributed replicated volumes distribute files across replicated bricks in the volume. Such distributed replicated volumes can be used in situations where scalability and high-reliability are critical. Distributed replicated volumes also offer improved read performance in most environments.

Distributed replicated volumes may be divided into multiple sub-volumes. Each sub-volume may include a number of servers. Each server may have one or more brick (i.e., export directories) thereon. A particular file may be redundantly stored on two separate bricks on two separate servers in a particular sub-volume. Other sub-volumes may replicate other files across bricks in a similar manner. It is desirable to perform operations on the distributed replicated volume in an efficient manner.

SUMMARY

According to one example, a method includes, creating at least one distributed replicated volume having a plurality of sub-volumes, wherein each sub-volume of the plurality of sub-volumes includes at least one brick. The method further includes creating at least one volfile content file associated with the at least one distributed replicated volume, wherein the at least one volfile content file includes a description of at least one of the plurality of sub-volumes and a description of at least one brick corresponding to the at least one sub-volume. The method further includes using the volfile content file to perform an operation on at least one of the plurality of sub-volumes without performing the operation on other sub-volumes in the plurality of sub-volumes.

According to one example, a system includes a processor and a memory comprising machine readable instructions that when executed by the processor, cause the system to create at least one volume having a plurality of sub-volumes, wherein each sub-volume of the plurality of sub-volumes includes at least one brick. The machine readable instructions are further to create at least one volfile content file associated with the at least one volume, wherein the at least one volfile content file includes a description of at least one of the plurality of sub-volumes and a description of at least one brick corresponding to the at least one sub-volume. The machine readable instructions are further to use the volfile content file to perform an operation on at least one of the plurality of sub-volumes without performing the operation on other sub-volumes in the plurality of sub-volumes.

According to one example, a non-transitory machine-readable medium having stored thereon machine-readable instructions executable to cause a machine to perform operations comprising creating at least one distributed replicated volume having a plurality of sub-volumes, wherein each sub-volume of the plurality of sub-volumes includes at least one brick. The machine-readable instruction are further to creating at least one volfile content file associated with the at least one distributed replicated volume, wherein the at least one volfile content file includes a description of at least one of the plurality of sub-volumes and a description of at least one brick corresponding to the at least one sub-volume. The machine-readable instructions are further to using the volfile content file to perform an operation on a single sub-volume of the plurality of sub-volumes.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Distributed file systems may provide a number of advantages. For example, some distributed file systems have the ability to scale to several petabytes of data. Distributed file systems may also have the ability to handle thousands of clients. Distributed file systems may be POSIX compatible, use commodity hardware, and allow optimization for different workloads. Distributed file systems also provide replication, quotas, geo-replication, snapshots, and bitrot detection. Some distributed file systems, like the Gluster file system, do not maintain a metadata server, and instead locate files algorithmically using an elastic hashing algorithm.

In some distributed file systems, when an operation needs to be performed on one of the sub-volumes or bricks, the operation is performed on all of the sub-volumes and bricks of the particular volume. However, it may be desirable to perform an operation on one or more of the sub-volumes or bricks of the volume, without performing the operation on all of the sub-volumes and bricks of that particular volume.

According to principles described herein, a distributed file system is given the ability to perform operations on specific sub-volumes and bricks of a volume by utilizing data that is generated when the volume is first created. Specifically, when a volume is first created, a volfile content file is stored for that particular volume. The volfile content file includes various pieces of information about the volume, its sub-volumes, the bricks of the sub-volumes, and other information. Having this data allows the distributed file system to perform operations on the individual bricks and sub-volumes without having to apply the same operations to other bricks and sub-volumes.

For example, each of the sub-volumes in a volume may have a replica count of three. This means that for each file stored, that file will be replicated across three different bricks. In some cases, it may be desirable to increase the replica count for one of the sub-volumes but not the other sub-volumes. Using the information included in the volfile content file, a file system management daemon may, for example, increase the replica count for one sub-volume without increasing the replica count of other sub-volumes in the distributed file system. This increases the efficiency and flexibility of the distributed file system, as well as allows for different types of sub-volumes to be supported at the same time by the volume.

By way of further example, if it is desirable to remove one brick from a sub-volume of a distributed replicated volume with a replica count of 3, a particular brick may be removed from a single sub-volume by changing the replica count of that single sub-volume by utilizing the knowledge from the volfile content file. This is much more efficient than having to remove a brick from each sub-volume.

By way of further example, the generated volfile content file may be stored in a central store, instead of being in all the nodes of the cluster. This allows for the avoidance of out-of-sync issues and increases the systems efficiency. For example, if the nodes are down when the volume files are generated, those nodes will have old contents of the volfile content file. Instead, by utilizing a central store, the central store will always have the most recent volume files and will solve out-of-sync issues and significantly reduce network traffic.

Figure 1:
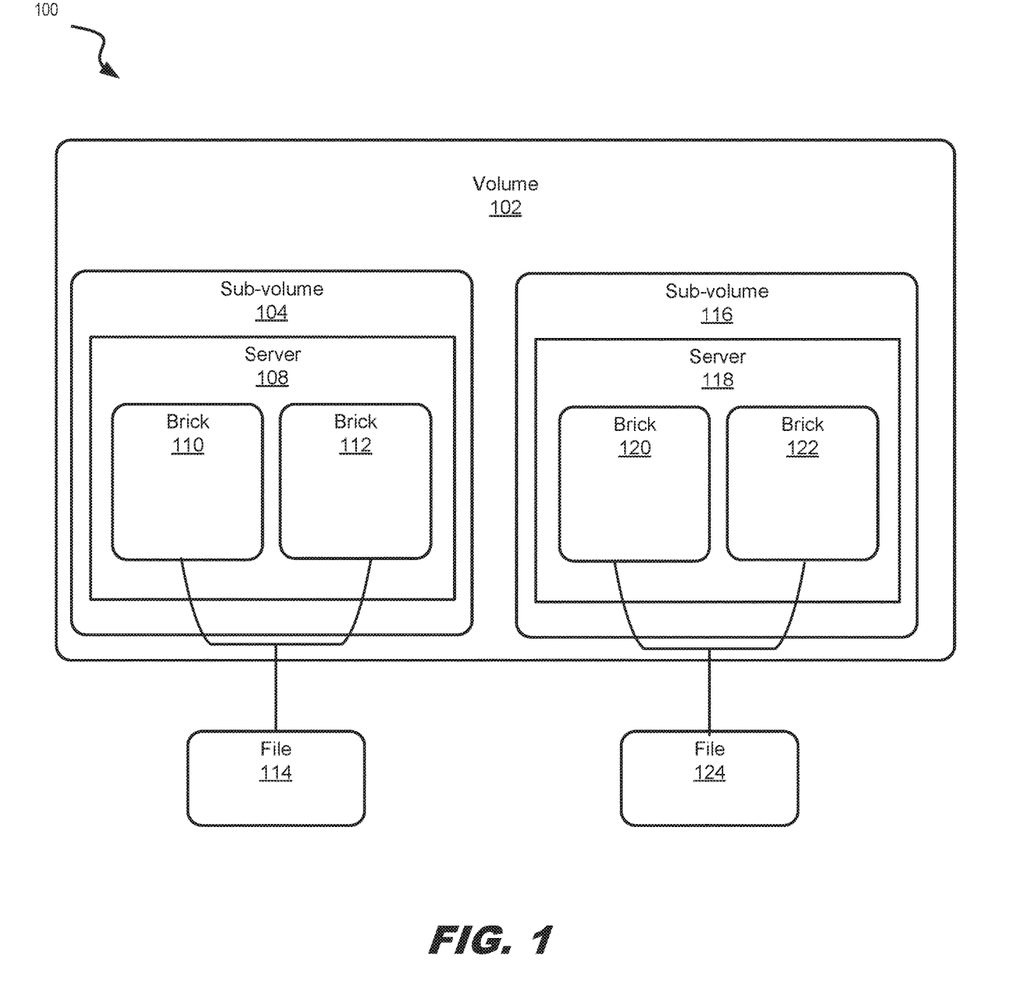
FIG. 1 is a diagram showing an illustrative system involving a distributed replicated volume that aggregates various storage servers over a network that interconnects into one large parallel network file system.

FIG. 1 is a diagram showing an illustrative system 100 involving a volume 102 that aggregates various storage servers over a network that interconnects into one large parallel network file system. The volume 102 may include two sub-volumes, such as sub-volume 104 and sub-volume 116. According to the present example, sub-volume 104 includes server 108, which includes brick 110 and brick 112. The contents of file 114 may be replicated between brick 110 and brick 112. Additionally, sub-volume 116 includes server 118, which includes brick 120 and brick 122. The contents of file 124 may be replicated between brick 120 and brick 122. While the present example illustrates only a single server corresponding to each sub-volume, some examples may have multiple servers associated with a particular sub-volume.

Volume 102 may have sub-volumes, such as sub-volume 104 and sub-volume 116, each of which may include one or more bricks. Distributed file systems allow for multiple clients to concurrently access data that is spread across bricks. Volume 102 may be one of many types of distributed file systems. Distributed volumes are useful when the goal is to scale storage, and redundancy is either not important or is already provided by other hardware and/or software. Additional types of volumes may be replicated volumes, which are replicated across bricks in the volume. Replicated volumes are useful in environments where high-availability and high-reliability are critical. Distributed replicated volumes distribute files across replicated bricks in the volume. Distributed replicated volumes are useful in environments where the requirement is to scale storage and high-reliability is critical.

Sub-volume 104 and sub-volume 116 may each include a logical collection of bricks, where each brick is an export directory on a server. There are different operations that can be performed on the volumes. For example, different operations may include expanding, shrinking, replacing, or rebalancing. A volume may be expanded by adding a brick to the volume in order to increase the capacity of the volume. Additionally, a volume may be shrunk by removing a brick from the volume. A volume may want to be shrunk because, for example, the brick has become inaccessible due to a hardware or network failure. A volume may also want to replace a faulty brick, which is done by adding a new brick and removing the faulty brick. The shrinking or replacing of a brick may automatically trigger the rebalancing of the remaining bricks. The rebalancing operation may include redistributing the data across the bricks so that each of the bricks includes approximately the same amount of data.

Server 108 may deploy and support bricks 110 and 112. Additionally, server 108 may be a web server, may exist remotely, and/or may run on a separate platform. Furthermore, server 108 may be pooled with other storage servers over TCP/IP or Remote Direct Memory Access (RDMA).

Bricks 110 and 112 refers to any device that is being used for storage, which may be represented by an export directory on a server of a storage pool of computing systems working together. For example, data from node 114 may be distributed between brick 110 and brick 112. By way of further example, when a large file is being stored in a brick, where the brick may be frequently accessed by many clients at the same time, it may be desirable to divide the data into different stripes, and then store those particular stripes into one or more bricks. This results in the data being distributed, and the file may be fetched faster.

File 114 may be, for example, any type of file, collection of data, programs, etc. that may be stored in a computing device's memory or on a storage device.

Server 118 may deploy and support bricks 120 and 122. Additionally, server 118 may be a web server, may exist remotely, and/or may run on a separate platform. Furthermore, server 118 may be pooled with other storage servers over TCP/IP or Remote Direct Memory Access (RDMA).

Bricks 120 and 122 refers to any device that is being used for storage, which may be represented by an export directory on a server of a storage pool of computing systems working together. For example, data from file 124 may be distributed between brick 120 and brick 112. By way of further example, when a large file is being stored in a brick, where the brick may be frequently accessed by many clients at the same time, it may be desirable to divide the data into different stripes, and then store those particular stripes into one or more bricks. This results in the data being distributed, and the file may be fetched faster.

File 124 may be, for example, any type of file, collection of data, programs, etc. that may be stored in a computing device's memory or on a storage device.

Figure 2:
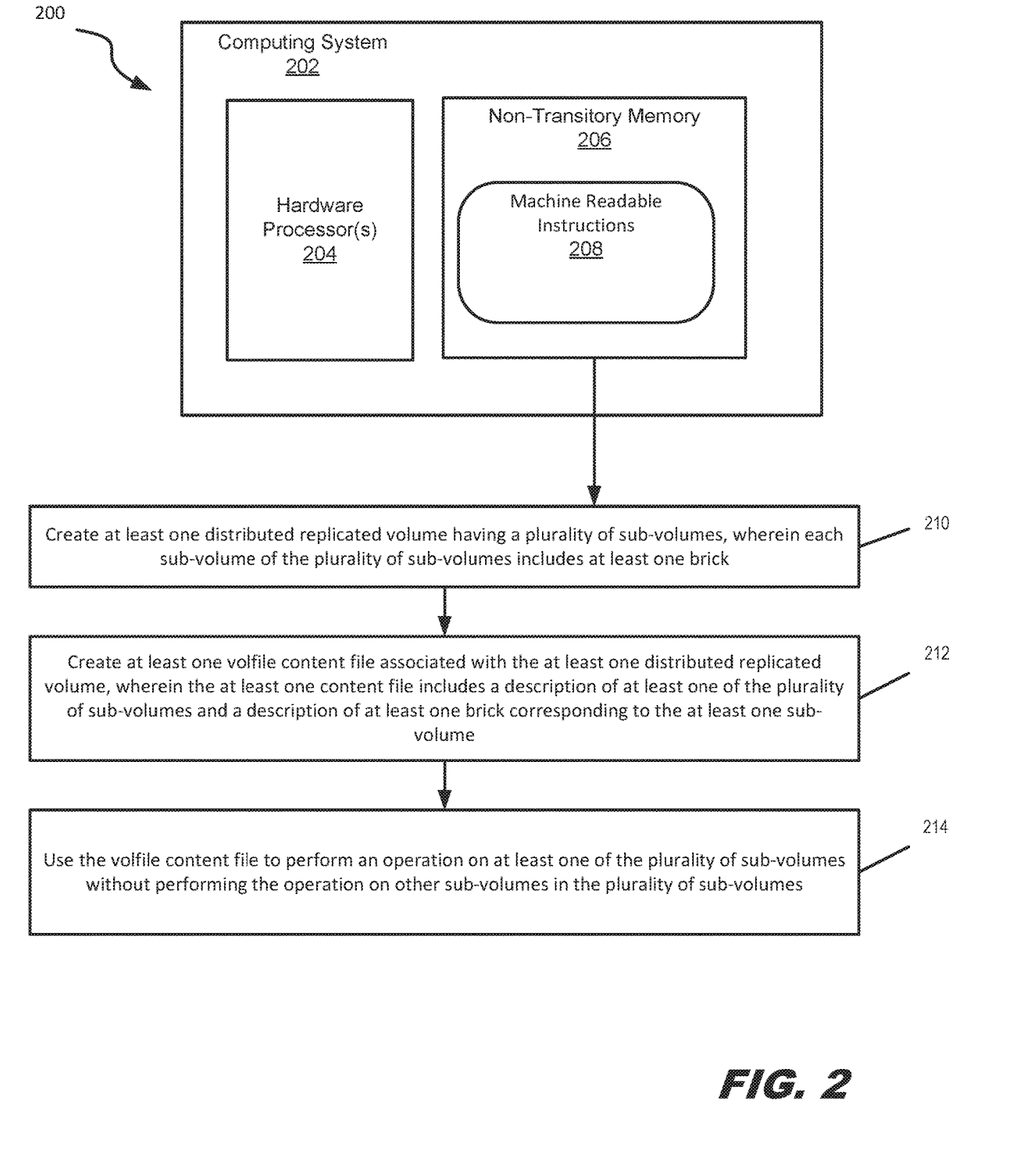
FIG. 2 is a diagram showing an illustrative system involving a computing system that includes hardware such as a hardware processor(s) and a non-transitory memory.

FIG. 2 is a diagram showing an illustrative system 200 involving a computing system 202 that includes hardware such as a hardware processor(s) 204 and a non-transitory memory 206. Additionally, the non-transitory memory 206 includes machine readable instructions 208, that execute the following steps: create at least one distributed replicated volume having a plurality of sub-volumes, wherein each sub-volume of the plurality of sub-volumes includes at least one brick 210, create at least one volfile content file associated with the at least one distributed replicated volume, wherein the at least one volfile content file includes a description of at least one of the plurality of sub-volumes and a description of at least one brick corresponding to the at least one sub-volume 212, and use the volfile content file to perform an operation on at least one of the plurality of sub-volumes without performing the operation on other sub-volumes in the plurality of sub-volumes 214.

The computing system 202 may be, for example, a desktop computer, a tablet computer, or a smart phone. The computing system 202 may include a processor 204, which may be a hardware processor (such as a central processing unit (CPU) or a graphics processing unit (GPU)) that may be programmed to execute software applications. Additionally, for example, the processor 204 may represent one or more general-purpose processing devices such as a microprocessor, central processing unit, or the like. By way of further example, the processor 204 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 204 may also be one or more special-purpose processing devices such as an application specific integrated circuit (ASIC), a field programmable gate array (FPGA), a digital signal processor (DSP), network processor, or the like. The processor 204 is configured to execute instructions for performing the operations and steps discussed herein.

The non-transitory memory 206 refers to the working memory of the computing system 202. Working memory is typically Random Access Memory (RAM) and is designed for speed. Working memory is often a volatile form of memory, meaning that it loses its data when power is no longer supplied. The first computing system 102 may, however, have other forms of memory available such as solid state drives, Network-Attached Storage (NAS) drives, Redundant Array of Independent Disks (RAID) drives, and other non-volatile storage devices. The various types of memory may store information in the form of software and data. The memory 206 may designate various blocks of memory for use by the first computing system 202. These blocks of memory may be ranges of physical memory addresses or virtual memory addresses.

A computing system such as the computing system 202 typically includes at least hardware capable of executing machine readable instructions 208, as well as the software for executing acts (typically machine-readable instructions) that produce a desired result. In some examples, a computing system may include hybrids of hardware and software, as well as computer sub-systems.

The non-transitory memory 206 includes machine readable instructions 208, that is configured to execute the following steps: create at least one distributed replicated volume having a plurality of sub-volumes, wherein each sub-volume of the plurality of sub-volumes includes at least one brick 210, create at least one volfile content file associated with the at least one distributed replicated volume, wherein the at least one volfile content file includes a description of at least one of the plurality of sub-volumes and a description of at least one brick corresponding to the at least one sub-volume 212, and use the volfile content file to perform an operation on at least one of the plurality of sub-volumes without performing the operation on other sub-volumes in the plurality of sub-volumes 214. In some examples, the computing system 202 may be a file management daemon that stores volfile content files.

Figure 3:
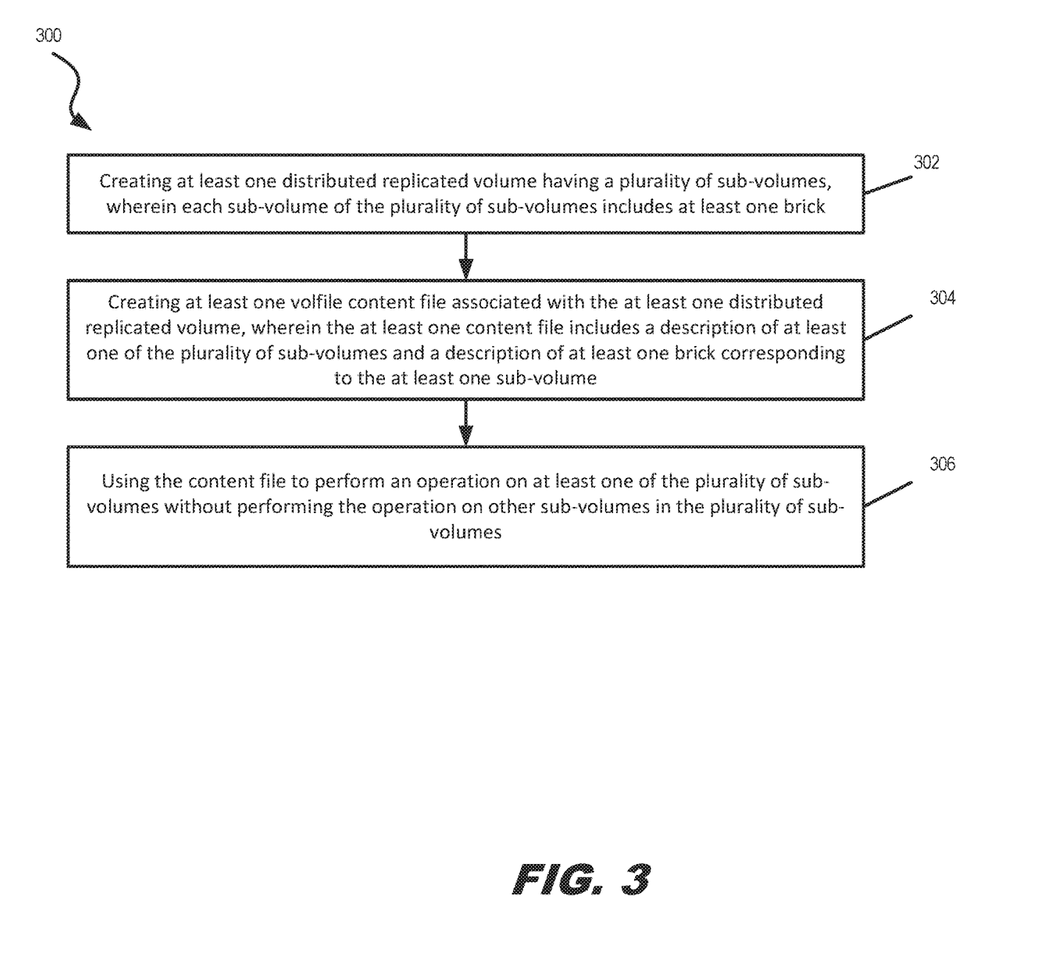
FIG. 3 is a diagram showing an illustrative method for using content associated with at least one distributed replicated volume to perform operations on at least one of a plurality of sub-volumes.

FIG. 3 is a diagram showing an illustrative method 300 for using content associated with at least one distributed replicated volume to perform operations on at least one of a plurality of sub-volumes. According to the present example, the method starts at step 302, in which at least one distributed replicated volume is created, having a plurality of sub-volumes, wherein each sub-volume of the plurality of sub-volumes includes at least one brick. For example, the distributed replicated volume may include one sub-volume that includes at least one brick. Additionally, for example, the distributed replicated volume may include multiple sub-volumes that include at least one brick.

At step 304, at least one volfile content file is created, which is associated with the at least one distributed replicated volume, wherein the at least one volfile content file includes a description of at least one of the plurality of sub-volumes and a description of at least one brick corresponding to the at least one sub-volume. The volfile content file may be automatically created upon the creation of the distributed replicated volume. Additionally, for example, the volfile content file may be created by a user command to do so. The volfile content file may be updated at regular intervals or updating the volfile content file may be triggered by an event, such as the creation or removal of a sub-volume, a brick, or the addition of a new node. A new version may be created each time the volfile content file is updated. There may be multiple volfile content files, where each sub-volume has a volfile content file and each distributed replicated volume has a volfile content file. Furthermore, the volfile content file may be stored in the distributed replicated volume, or the volfile content file may be stored remotely from the distributed replicated volume.

The volfile content file associated with the distributed replicated volume may include a description of at least one of the plurality of sub-volumes that the distributed replicated volume includes. Additionally, the volfile content file may also include the description of at least one of the bricks that the sub-volume includes. The description may include an identifier of at least one of the sub-volumes and at least one of the bricks included in the sub-volume, as well as the size of each of the components. The volfile content file may also include a descriptor that indicates how the sub-volumes and the bricks are related to each other. The volfile content file may also include a description regarding the list of clients connected to the distributed replicated volume, as well and the inode tables of the volume. The volfile content file may also include a description of how many bricks are in each sub-volume. The volfile content file may also include the memory usage and memory pool details of the bricks. The description may also include information describing the history of the sub-volumes and/or bricks, such as information describing sub-volumes and/or bricks that previously existed but have since been shut down. The volfile content file may be selective in its descriptions, where only the descriptions of the most used sub-volumes and bricks are included. For example, the user or the system may have a threshold, where the volfile content file only includes the descriptions for the sub-volumes and/or the bricks that meet or surpass the threshold. By way of further example, the threshold may correspond to a particular usage statistic of a sub-volume and/or a brick. The usage statistic may include, for example, the percent of disk space that is utilized, the file size, the size of the cached data, the status of the sub-volume and/or brick, or the amount of free disk space. By way of further example, the volfile content file may indicate whether each sub-volume and/or brick in the distributed replicated volume is above or is below the threshold.

At step 306, the volfile content file is used to perform an operation on at least one of the plurality of sub-volumes without performing the operation on other sub-volumes in the plurality of sub-volumes. Examples of operations may include removing a brick, adding a brick, or replacing a brick. The operation may be performed on one sub-volume, for example, without requiring the operation to be performed on all of the other sub-volumes included in the distributed replicated volume. For example, the operation may be performed on a select number of sub-volumes and/or bricks. By way of further example, the operation may be performed on a select number of sub-volumes and/or bricks that are above or are below a particular threshold.

Figure 4:
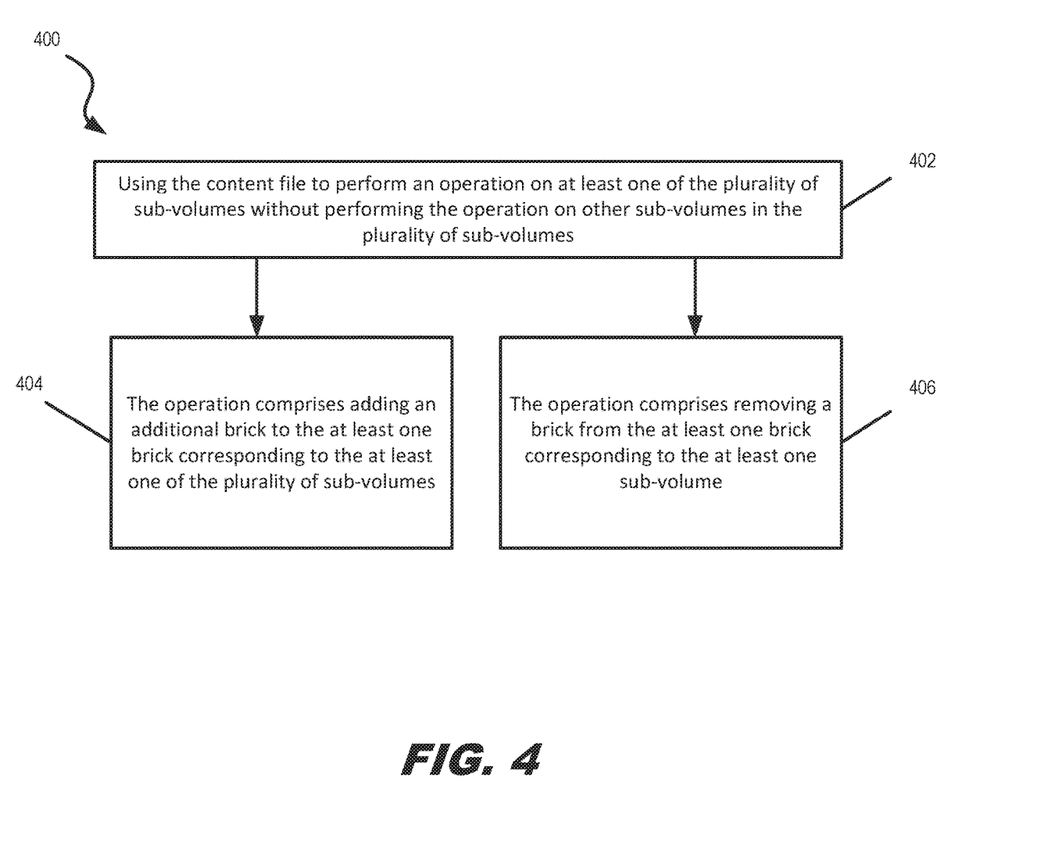
FIG. 4 is a diagram showing an illustration that indicates the kind of operations that the invention is directed towards.

FIG. 4 is a diagram showing an illustration 400 that indicates the kind of operations that the invention is directed towards. According to the present example, the method starts at step 402, in which the volfile content file is used to perform an operation on at least one of the plurality of sub-volumes without performing the operation on other sub-volumes in the plurality of sub-volumes. For example, the operation may be performed on one sub-volume, without requiring the operation to be performed on all of the other sub-volumes included in the distributed replicated volume. For example, the operation may be performed on a select number of sub-volumes and/or bricks. By way of further example, the operation may be performed on a select number of sub-volumes and/or bricks that are above or are below a particular threshold.

At step 404, the operation comprises adding an additional brick to the at least one brick corresponding to the at least one of the plurality of sub-volumes. For example, a sub-volume may have a brick added to the at least one brick that corresponds to the sub-volume without adding a brick to the other sub-volumes at least one brick. This may result in the groups of bricks corresponding to each of the sub-volumes having an unequal number of bricks.

At step 406, the operation comprises removing a brick from the at least one brick corresponding to the at least one sub-volume. For example, a sub-volume may have a group of bricks that corresponds to the sub-volume. A brick from the group of bricks may be removed, but this may be done without removing a brick from any of the other groups of bricks that each correspond to a different sub-volume. This may result in the groups of bricks corresponding to each of the sub-volumes having an unequal number of bricks.

Figure 5:
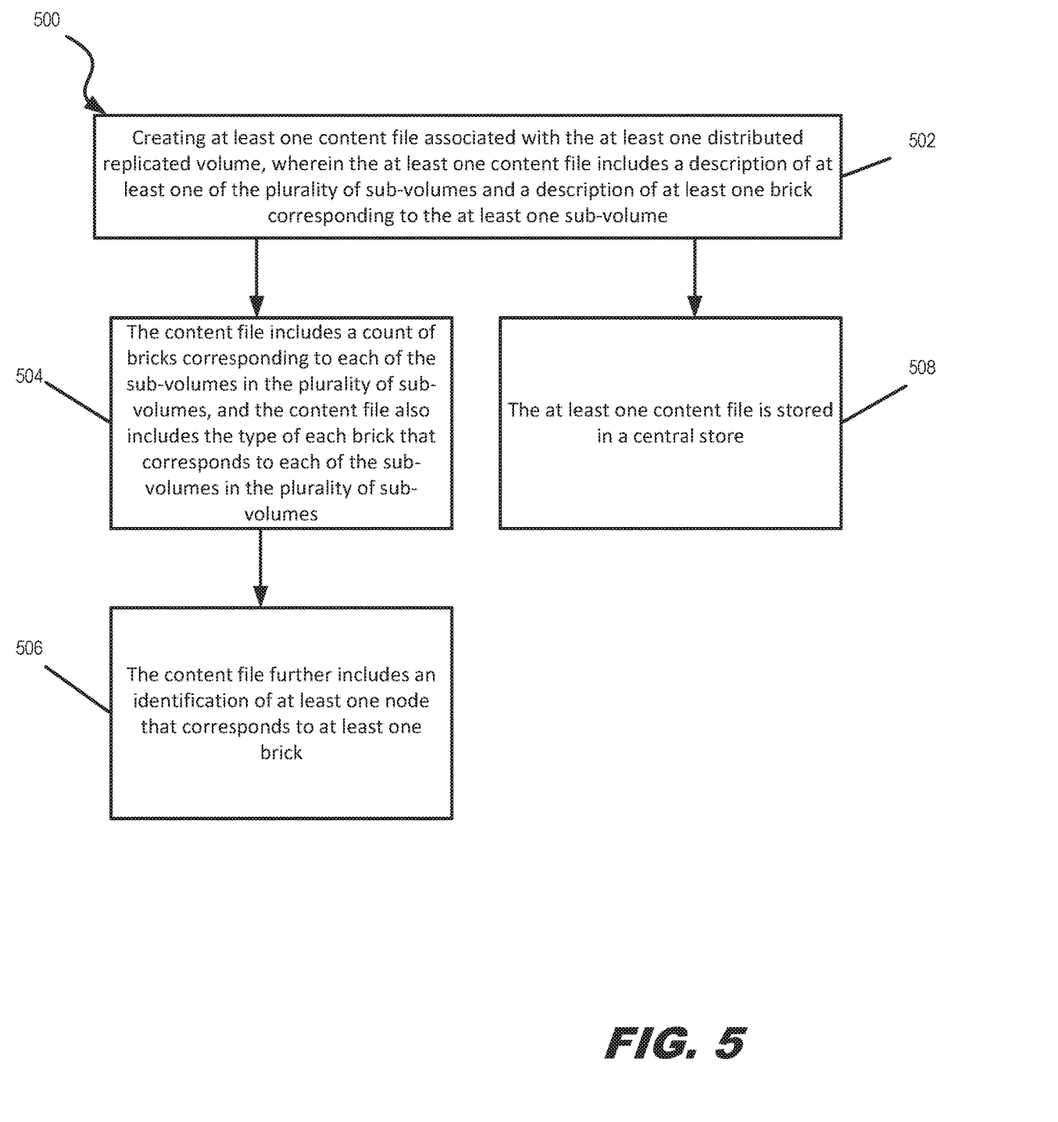
FIG. 5 is a diagram showing an illustration of attributes of the volfile content file.

FIG. 5 is a diagram showing an illustration 500 of attributes of the volfile content file. According to the present example, the method starts at step 502, at least one volfile content file is created, which is associated with the at least one distributed replicated volume, wherein the at least one volfile content file includes a description of at least one of the plurality of sub-volumes and a description of at least one brick corresponding to the at least one sub-volume. Additionally, for example, the volfile content file may also include descriptions for the nodes that are utilizing sub-volumes. The description may be in different types of syntax, such as plain text, HTML, XML, numbers, or characters.

At step 504, the volfile content file includes a count of bricks corresponding to each of the sub-volumes in the plurality of sub-volumes, and the volfile content file also includes the type of each brick that corresponds to each of the sub-volumes in the plurality of sub-volumes. For example, the count of bricks and the type of each brick may be in different types of syntax, such as plain text, HTML, XML, numbers, or characters.

At step 506, the volfile content file further includes an identification of at least one node (e.g., physical server) that corresponds to at least one brick. The identification may be in different types of syntax, such as plain text, HTML, XML, numbers, or characters.

At step 508, the at least one volfile content file is stored in a central store. For example, the volfile content file may be stored in a central store that is a part of the distributed replicated volume. By way of further example, the volfile content file may be stored in a central store that is remote from the distributed replicated volume. Additionally, the volfile content file may be accessible by only the node(s) that correspond to the sub-volumes that are a part of the distributed replicated volume. Furthermore, the volfile content file may be accessible by all the node(s) in the system.

Some examples of processing systems described herein may include non-transient, tangible, machine readable media that include executable instructions that when run by one or more processors (e.g., processor 104) may cause the one or more processors to perform the processes of method 200 as described above. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
    creating at least one distributed replicated volume having a plurality of sub-volumes, wherein each sub-volume of the plurality of sub-volumes includes at least one brick;
    creating at least one content file associated with the at least one distributed replicated volume, wherein the at least one content file includes a description of at least one of the plurality of sub-volumes and a description of at least one brick corresponding to the at least one sub-volume, wherein the at least one content file only includes at least one of the plurality of sub-volumes and the at least one brick that correspond to the at least one sub-volume that meet or surpass a content usage threshold, the content usage threshold corresponding to a percent of utilized disk space; and using the content file to perform an operation on at least one of the plurality of sub-volumes without performing the operation on other sub-volumes in the plurality of sub-volumes, wherein the at least one of the plurality of sub-volumes are those that are below the content usage threshold.

2. The method of claim 1, wherein the operation comprises adding an additional brick to the at least one brick corresponding to the at least one of the plurality of sub-volumes.

3. The method of claim 1, wherein the operation comprises removing a brick from the at least one brick corresponding to the at least one sub-volume.

4. The method of claim 1, wherein the content file includes a count of sub-volumes in the plurality of sub-volumes corresponding to the distributed replicated volume.

5. The method of claim 4, wherein the content file includes a count of bricks corresponding to each of the sub-volumes in the plurality of sub-volumes, and the content file also includes the type of each brick that corresponds to each of the sub-volumes in the plurality of sub-volumes.

6. The method of claim 5, wherein the content file further includes an identification of at least one node that corresponds to at least one brick.

7. The method of claim 1, wherein the at least one content file is stored in a central store.

8. A system comprising:
a processor; and
a memory comprising machine readable instructions that when executed by the processor, cause the system to:
create at least one volume having a plurality of sub-volumes, wherein each sub-volume of the plurality of sub-volumes includes at least one brick;
create at least one content file associated with the at least one volume, wherein the at least one content file includes a description of at least one of the plurality of sub-volumes and a description of at least one brick corresponding to the at least one sub-volume, wherein the at least one content file only includes at least one of the plurality of sub-volumes and the at least one brick that correspond to the at least one sub-volume that meet or surpass a content usage threshold, the content usage threshold corresponding to a percent of utilized disk space; and
use the content file to perform an operation on at least one of the plurality of sub-volumes without performing the operation on other sub-volumes in the plurality of sub-volumes, wherein the at least one of the plurality of sub-volumes are those that are below the content usage threshold.

9. The system of claim 8, wherein the operation comprises adding an additional brick to the at least one brick corresponding to the at least one of the plurality of sub-volumes.

10. The system of claim 8, wherein the operation comprises removing a brick from the at least one brick corresponding to the at least one sub-volume.

11. The system of claim 8, wherein the content file includes a count of sub-volumes in the plurality of sub-volumes corresponding to the volume.

12. The system of claim 11, wherein the content file includes a count of bricks corresponding to each of the sub-volumes in the plurality of sub-volumes, and the content file also includes the type of each brick that corresponds to each of the sub-volumes in the plurality of sub-volumes.

13. The system of claim 12, wherein the content file further includes an identification of at least one node that corresponds to at least one brick.

14. The system of claim 8, wherein the at least one content file is a volfile.

15. A non-transitory machine-readable medium having stored thereon machine-readable instructions executable to cause a machine to perform operations comprising:
creating at least one distributed replicated volume having a plurality of sub-volumes, wherein each sub-volume of the plurality of sub-volumes includes at least one brick;
creating at least one content file associated with the at least one distributed replicated volume, wherein the at least one content file includes a description of at least one of the plurality of sub-volumes and a description of at least one brick corresponding to the at least one sub-volume, wherein the at least one content file only includes at least one of the plurality of sub-volumes and the at least one brick that correspond to the at least one sub-volume that meet or surpass a content usage threshold, the content usage threshold corresponding to a percent of utilized disk space; and
using the content file to perform an operation on a single sub-volume of the plurality of sub-volumes, wherein the single sub-volume is below the content usage threshold.

16. The non-transitory machine-readable medium of claim 15, wherein the operation comprises adding an additional brick to the at least one brick corresponding to the at least one of the plurality of sub-volumes.

17. The non-transitory machine-readable medium of claim 15, wherein the operation comprises removing a brick from the at least one brick corresponding to the at least one sub-volume.

18. The non-transitory machine-readable medium of claim 15, wherein the content file includes a count of sub-volumes in the plurality of sub-volumes corresponding to the distributed replicated volume.

19. The non-transitory machine-readable medium of claim 18, wherein the content file includes a count of bricks corresponding to each of the sub-volumes in the plurality of sub-volumes, and the content file also includes the type of each brick that corresponds to each of the sub-volumes in the plurality of sub-volumes.

20. The non-transitory machine-readable medium of claim 19, wherein the content file further includes an identification of at least one node that corresponds to at least one brick.

* * * * *